United States Patent [19]

Seligson

[11] Patent Number: 5,359,700
[45] Date of Patent: Oct. 25, 1994

[54] NEURAL NETWORK INCORPORATING DIFFERENCE NEURONS

[75] Inventor: Daniel Seligson, Palo Alto, Calif.

[73] Assignee: Intel Corporation, Santa Clara, Calif.

[21] Appl. No.: 8,071

[22] Filed: Jan. 22, 1993

Related U.S. Application Data

[63] Continuation of Ser. No. 692,676, Apr. 29, 1991, abandoned.

[51] Int. Cl.⁵ .............................................. G06F 15/42
[52] U.S. Cl. ........................................ 395/24; 395/27
[58] Field of Search .................................. 395/24, 27

[56] References Cited

U.S. PATENT DOCUMENTS

| | | | |
|---|---|---|---|
| 4,326,259 | 4/1982 | Cooper et al. | 364/715 |
| 4,760,604 | 7/1988 | Cooper et al. | 382/15 |
| 4,852,018 | 7/1989 | Grossberg et al. | 364/413.02 |
| 4,918,618 | 4/1990 | Tomilinson | 395/23 |
| 4,979,124 | 12/1990 | Sachse et al. | 395/1 |
| 5,052,043 | 9/1991 | Gaborski | 395/22 |
| 5,073,867 | 12/1991 | Murphy et al. | 395/27 |
| 5,097,141 | 3/1992 | Leivian et al. | 307/201 |
| 5,136,663 | 8/1992 | Nishio | 381/36 |
| 5,276,772 | 1/1994 | Wang et al. | 395/27 |

OTHER PUBLICATIONS

Poggio et al, "Regularization Algorithms for Learning that are Equivalent to Multilayer Networks", Science, Feb. 1990, 978–982.

Reilly et al, "An Overview of Neural Networks: Early Models to Real World Systems", An Intro. to Neural and Electronic Networks, 1990, 227–248.

Chen et al, "Orthogonal Least Squares Learning Algorithm for Radial Basis Function Networks", IEEE Trans Neural Networks, Mar. 1991, 302–309.

Hartstein et al, "A Self-Learning Threshold-Controlled Neural Network", Proc. IEEE Intl. Conf. on Neural Networks, Jul. 1988, I-425 to I-430.

Bailey et al, "Why VLSI Implementations of Associative VLCNs Require Connection Multiplexing", Proc. IEEE Intl. Conf. on Neural Networks, Jul. 1988, II-17-3-180.

McClelland et al, "Explorations in Parallel Distributed Processing", MIT Press, 1988, pp. 156–158.

Primary Examiner—Robert W. Downs
Attorney, Agent, or Firm—Blakely, Sokoloff, Taylor & Zafman

[57] ABSTRACT

An artificial neural network incorporating difference type, non-MP (McCullough-Pitts) neuron cells and a method and apparatus for training this network. More specifically, the output of each neuron cell is a nonlinear mapping of a distance metric of a difference vector and an offset. The difference vector is the difference between an input and a reference vector; the offset is representative of the radius of a hyperspheroidal discriminant function.

33 Claims, 10 Drawing Sheets

FIG_1 (PRIOR ART)
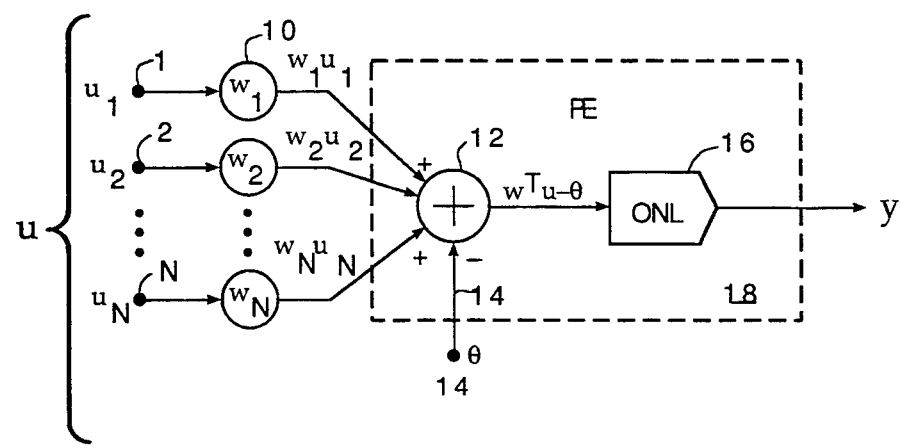
FIG_2a
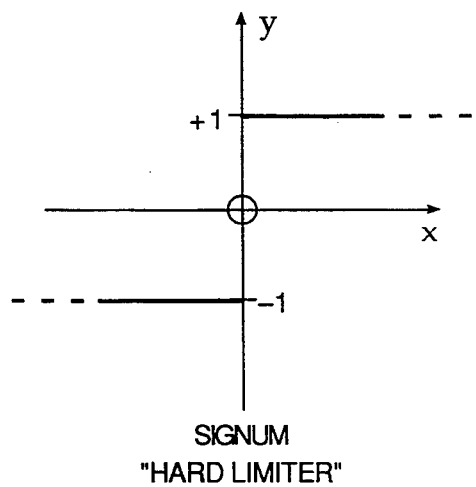
SIGNUM
"HARD LIMITER"
FIG_2b
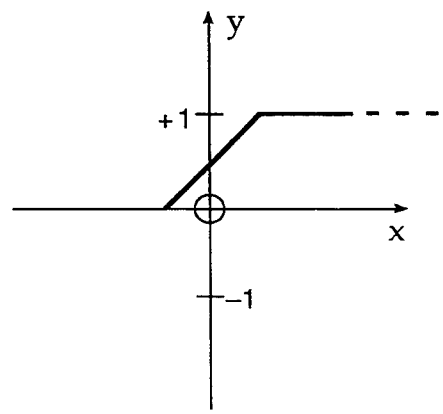
THRESHOLD LOGIC
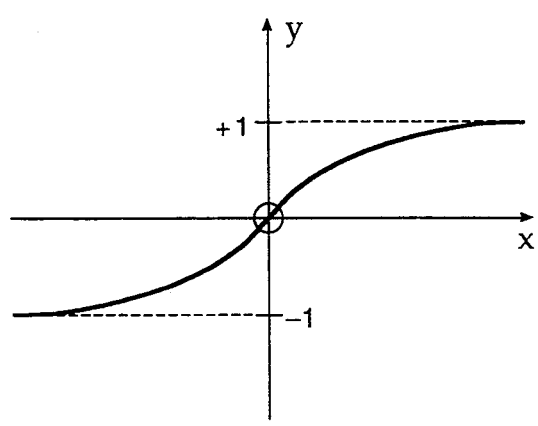
SIGMOID
"SOFT LIMITER"
FIG_2c

FIG_3a
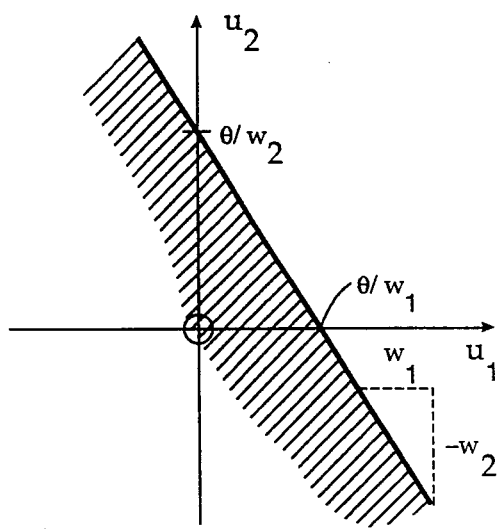
FIG_3b
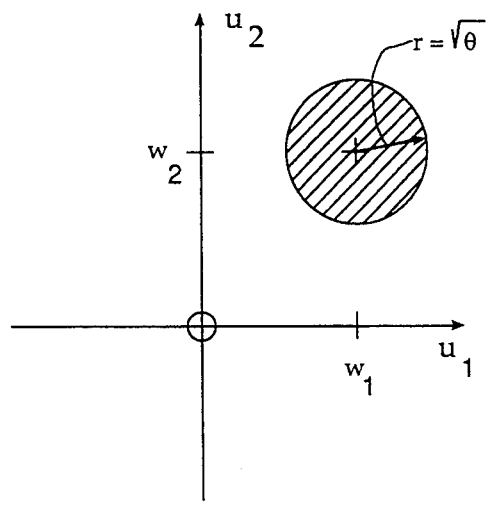
FIG_3c
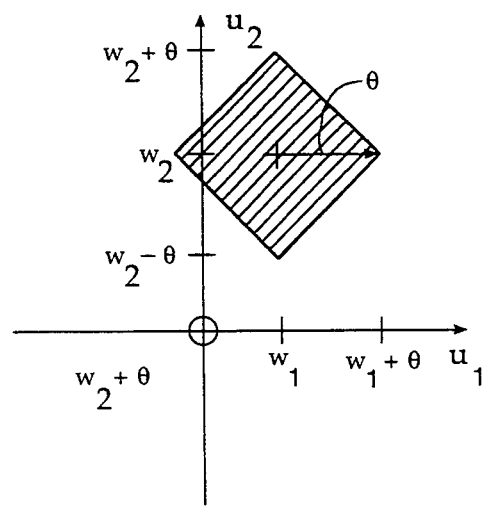

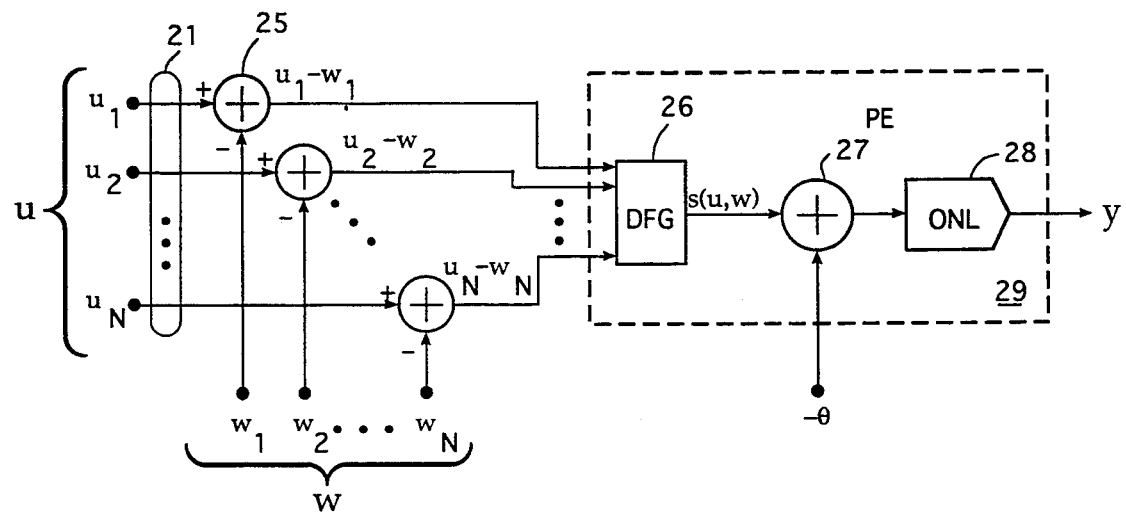
FIG_4
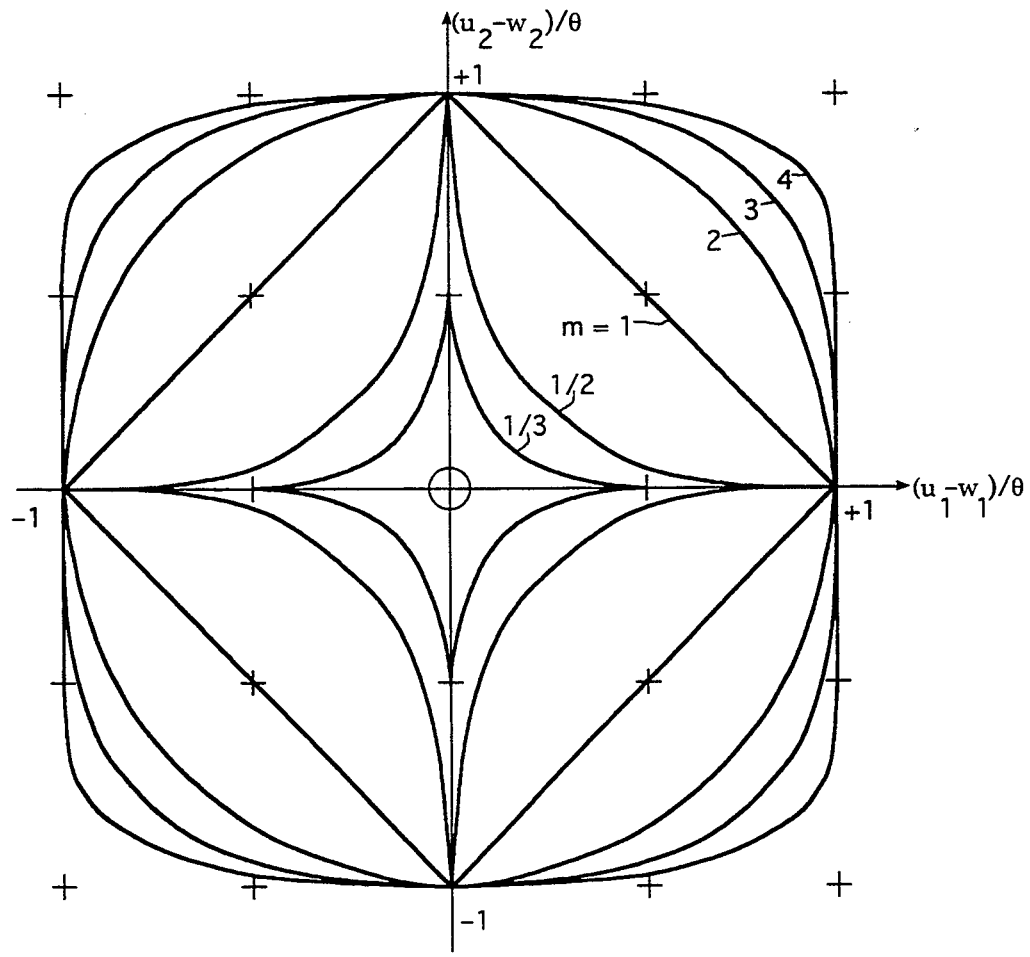
FIG_5

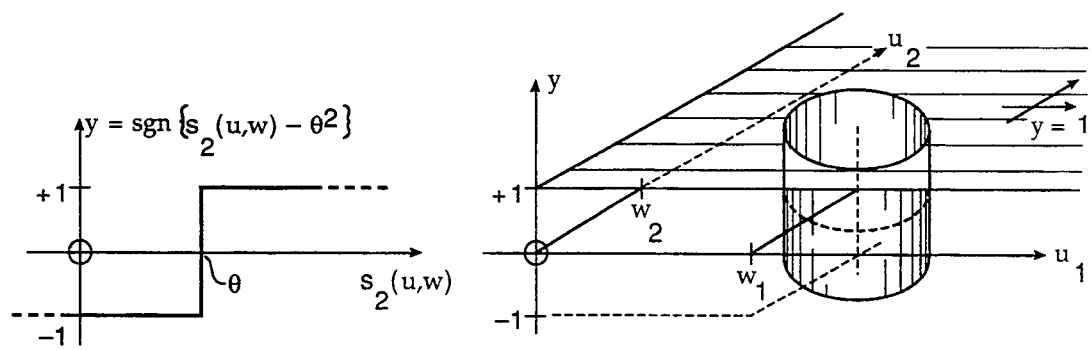
FIG_6a
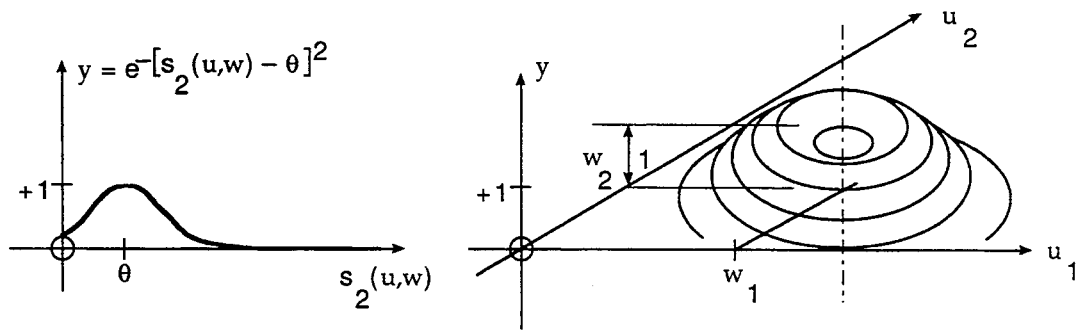
FIG_6b
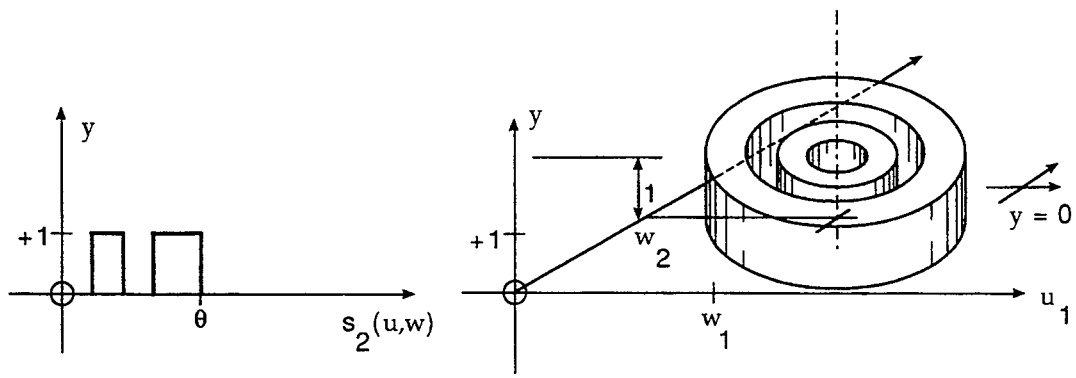
FIG_6c

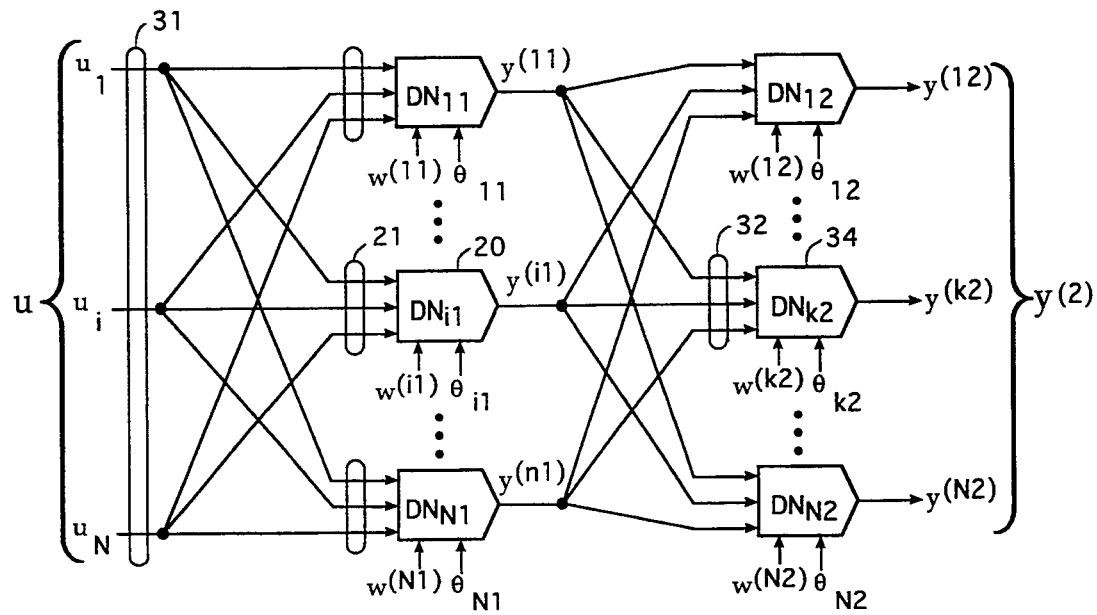
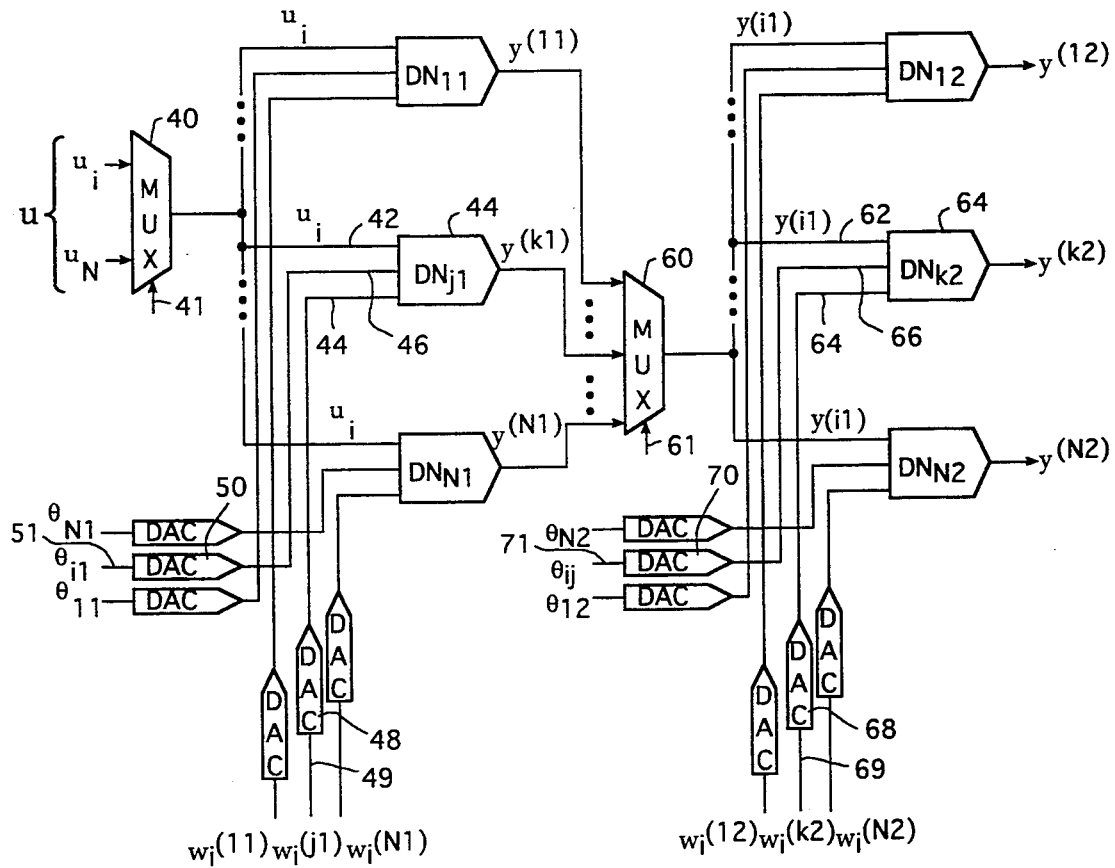

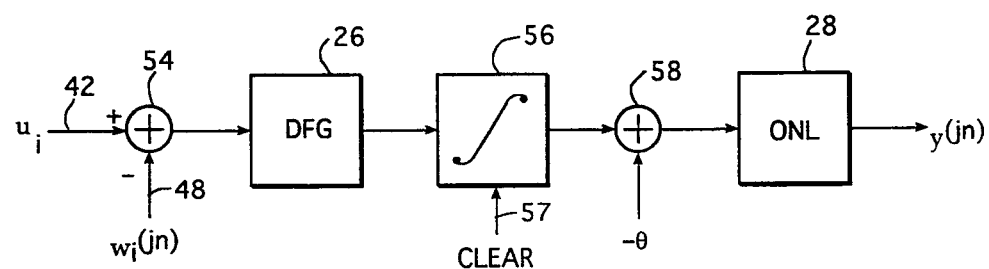
FIG_9
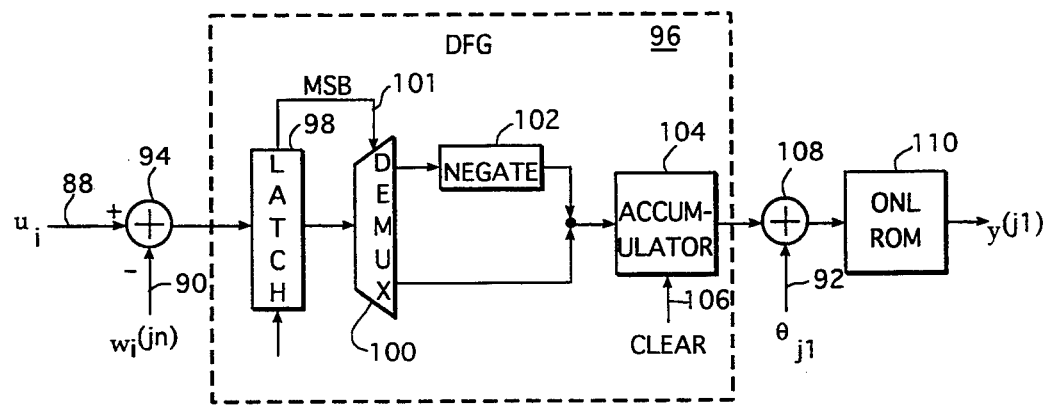
FIG_11
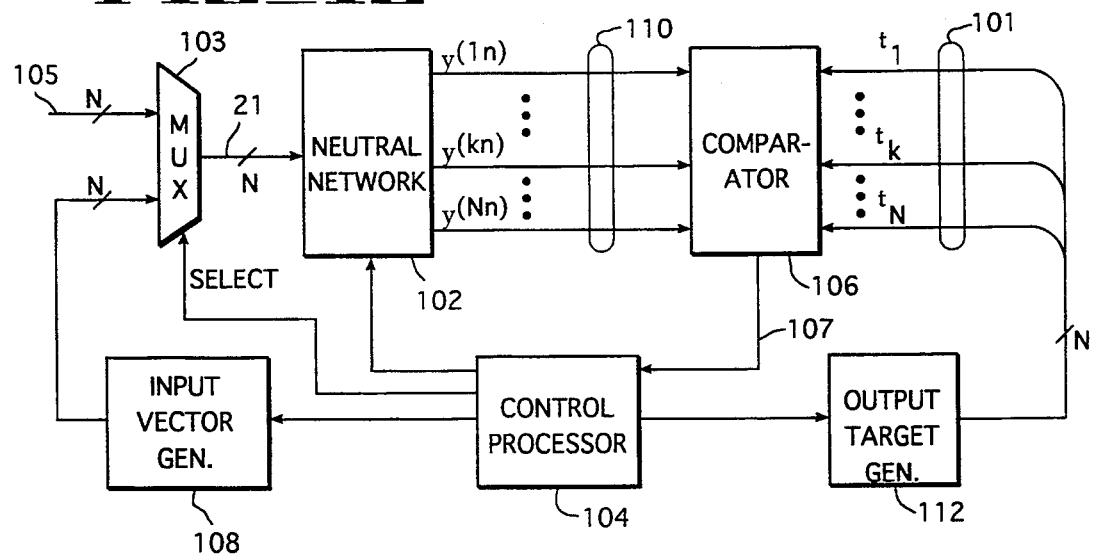
FIG_12

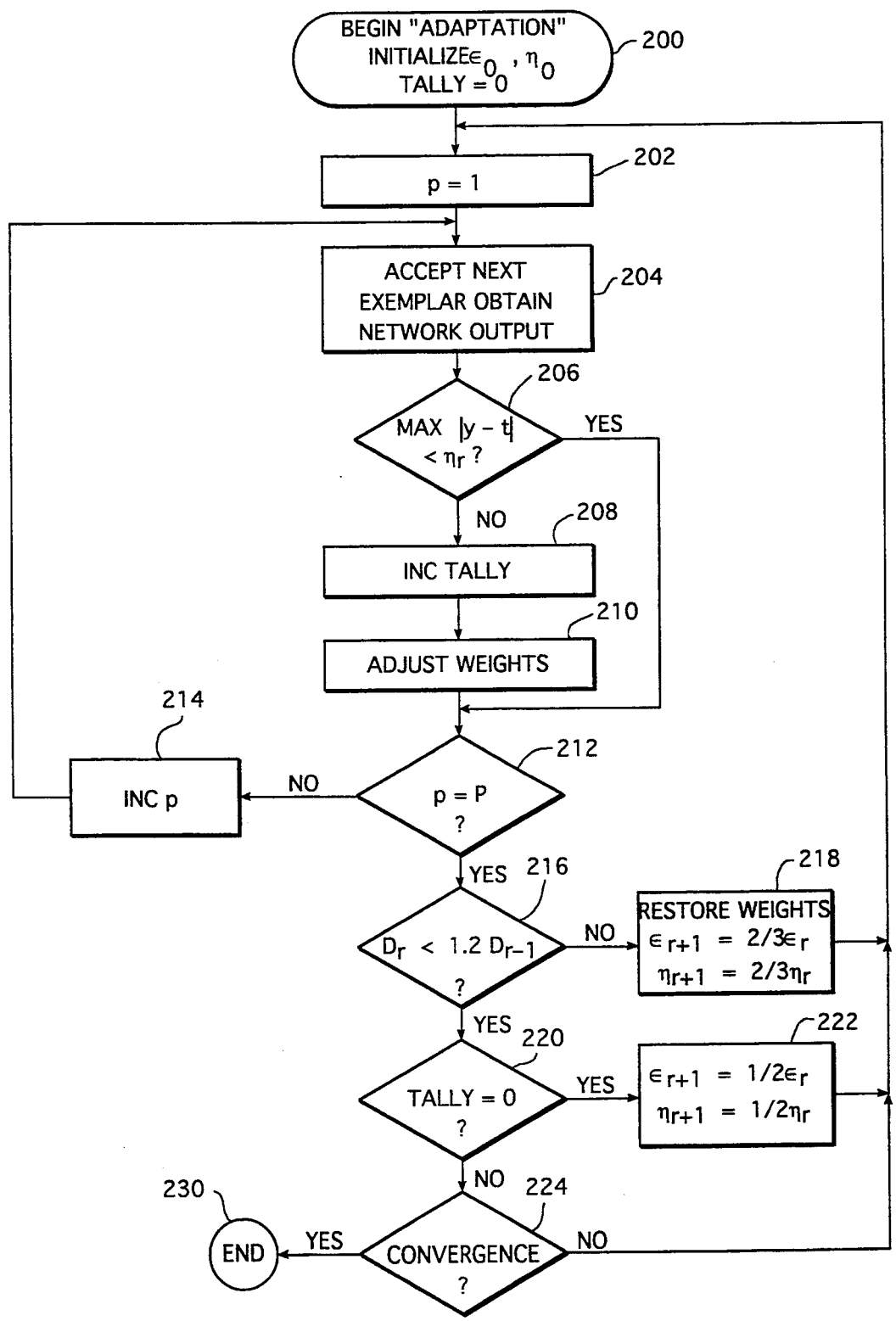

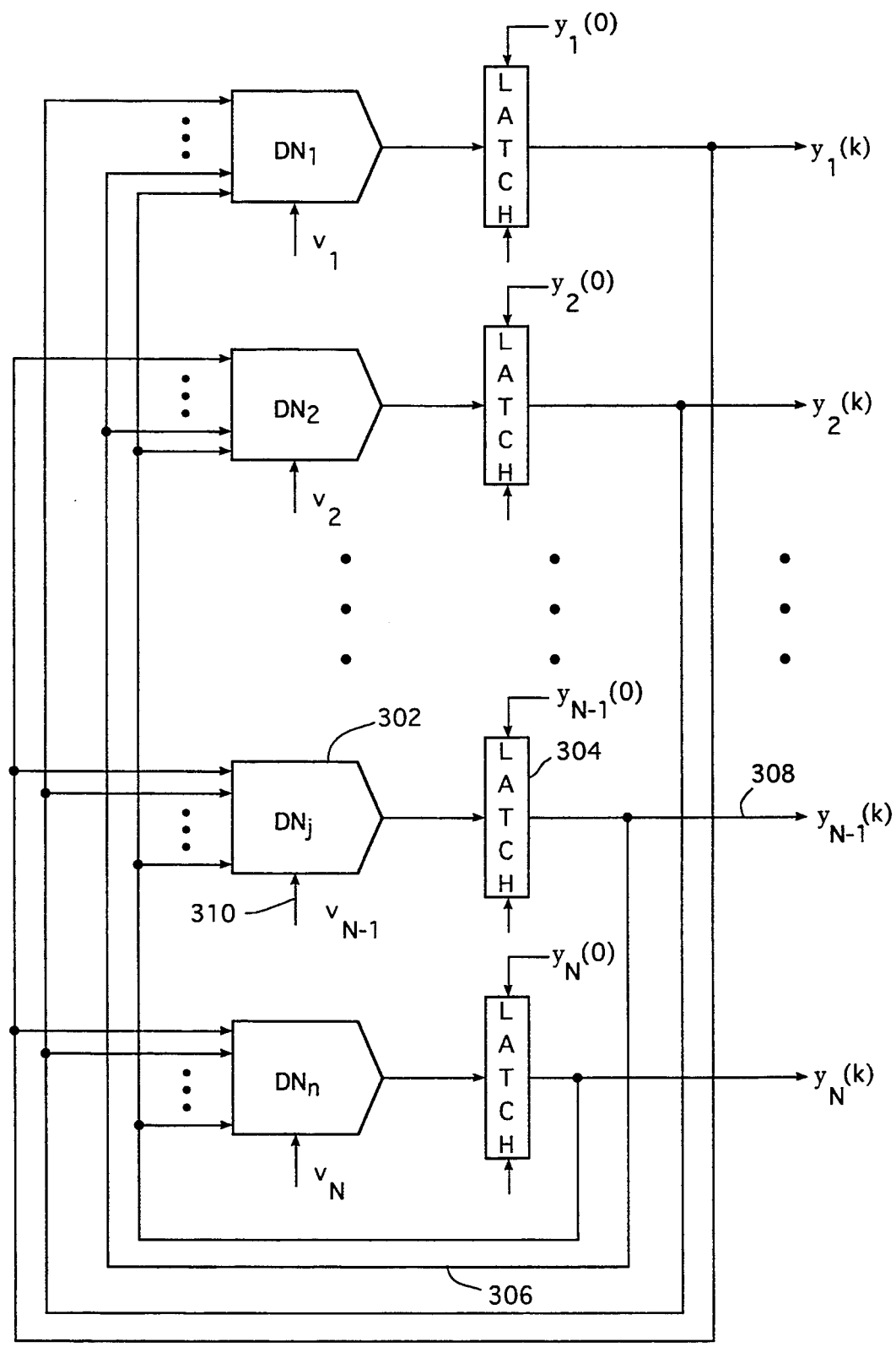
FIG_14

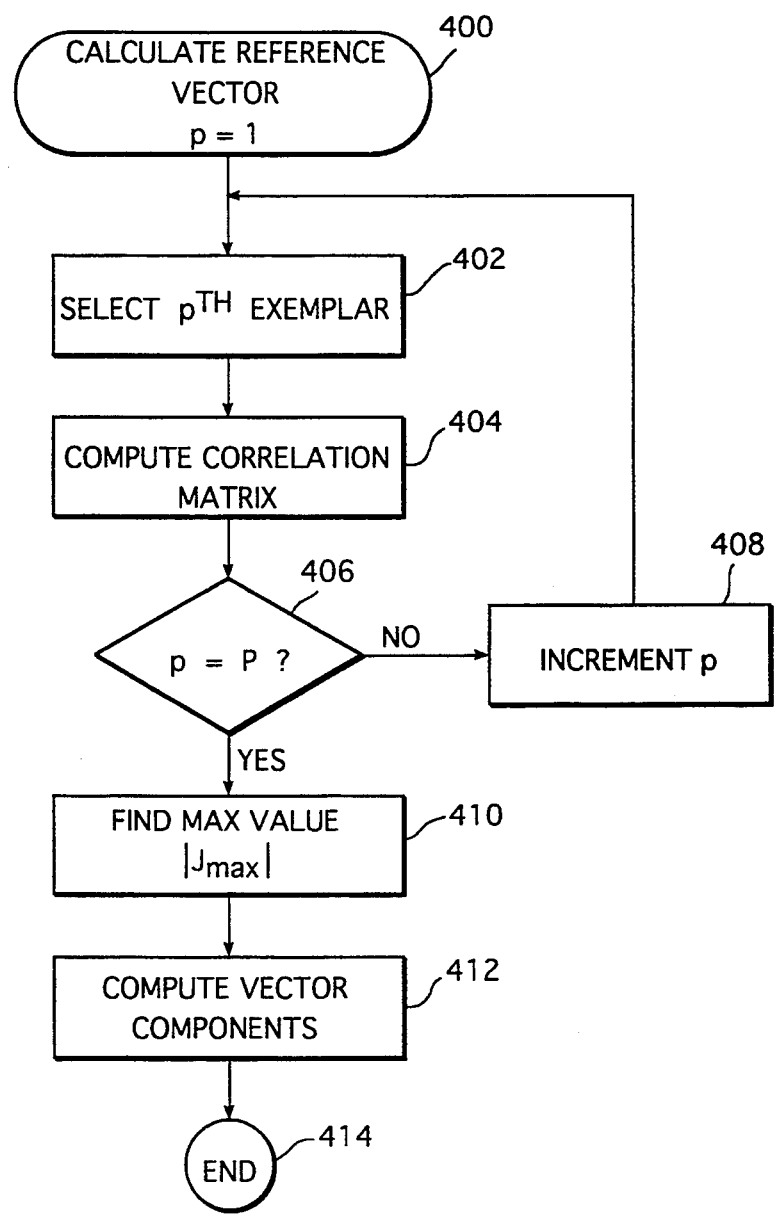
FIG_15

NEURAL NETWORK INCORPORATING DIFFERENCE NEURONS

This is a continuation of application Ser. No. 07/692,676, filed Apr. 29, 1991, now abandoned.

FIELD OF THE INVENTION

The invention pertains to the field of artificial neurons and neural networks that may use massively parallel and highly interconnected nonlinear computational nodes.

BACKGROUND OF THE INVENTION

The history of artificial neural networks beginnings with the pioneering work of McCulloch and Pitts published in the Bulletin of Mathematical Biophysics, vol. 5, pp 115–113 in 1943, an article entitled "A Logical Calculus of the Ideas Imminent in Nervous Activity", in which it was shown that the neuron, modeled as a simple threshold device, could compute by performing logic functions. In 1962, Rosenblatt wrote a book entitled "Principles of Neurodynamics" published by Spartan Books, New York in which the "perception", an adaptive (learning) neural network with a single neuron layer was defined. Soon after, it was recognized that these single layer neural structures were of limited usefulness. The computationally more powerful multilayer adaptive networks were studied leading to the publication of the book, "Parallel Distributed Processing", MIT Press, Cambridge Mass., 1986 by D. Rumelhart and J. C. McClelland, Eds., in which multilayer adaptive learning procedures are described, including the widely known backpropagation algorithm.

Neural network prior art has been mainly based on the neuronal model of McCulloch and Pitts (MP). The MP neuron is predicated on a model that produces an output determined by the weighted sum of inputs applied to a nonlinear, usually sigmoidal, thresholding function. The neuronal model in the present invention, based on a non-MP neuron referred to as a locally receptive field or difference neuron, is predicated on the use of a difference metric representing the difference between an input vector and a modifiable reference vector metric applied to the difference neuron. The output of each neuron is controlled by the distance metric between the two vectors, the offset applied to the distance metric, and by the output nonlinearity of the difference neuron.

Four major fields of application for neural networks include:
(1) classification of noise corrupted or incomplete patterns;
(2) associative or content-addressable memory for producing a class exemplar form an input pattern; and
(3) vector quantization for bandwidth compressions of image and speech data.
(4) Multivariate nonlinear function approximation and interpolation.

In each of these applications, the ability to discriminate clusters of data is an important attribute. A single MP neuron is only capable of dividing the decision space by a hyperplane in N-space or by a straight line in 2-space. Because of this property, the MP neuron is known as a linear separable discriminator limited to bisecting data space into two halves. Three layer networks of MP neurons are required to isolate a closed region in the signal vector space by means of hyperplanes.

A single difference neuron is capable of isolating a hyperspheroidal region in N-space by locating the center at a point defined by a reference vector, controlling its radius (or selectivity) by means of an offset, and controlling its shape by selecting an appropriate difference metric are each objects of this invention.

An article, describing prior art in difference neurons, written by T. Poggio and F. Girosi in an article entitled, "Regularization Algorithms for Learning That Are Equivalent to Multilayer Networks", Science, Vol. 247, 23 February 1990, pp. 978–982 describes a multilayer neural network consisting of a single layer of neurons in parallel with a linear network that forms a weighted sum of the input values, their outputs being combined in a single common summing junction. Each neuron forms a weighted radial basis function using a nonlinear operator on the Euclidean norm of the difference between an input vector and a reference vector. In this article the authors do not teach the application of offset to the difference norm for control of the radius nor do they teach the use of selecting norms to control the shape of hyperspheres.

Also, A. Hartstein and R. H. Koch, in an article entitled "A Self-Learning Threshold Controlled Neural Network", Proceedings of the IEEE Conference on Neural Networks, San Diego, July 1988, pp. 1–425 through 1–430, describe a Hopfield type network using a first order Minkowski distance metric for representing the difference between an input vector and a reference vector. A linear Hebbian learning rule based on the absolute error formed from the difference between the input and output vectors. The article does not teach the usefulness of offset in the control of selectivity nor the selection of a difference norm for purposes of controlling the hyperspheroidal shape.

The difference neural network of the present invention is supported by learning algorithms that adapt the reference vector weights and offset value so as to approximate the desired output response for a given input vector. These algorithms, are based on the error gradient relative to the reference vector. The reference vector consists of adjustable weights, one for each component of the input vector to each neuron cell. The offset value controls the resolution or radius of the hypersphere.

SUMMARY OF THE INVENTION

In view of the need for artificial neurons with better discriminant qualities, one of the objects of the present invention is to provide a difference neuron with adjustable hyperspheroidal discriminant characteristics.

Another object of the present invention is to provide an artificial neuron with user adjustable discrimination selectivity by controlling the hyperspheroidal radius.

Another object of the present invention is to provide user variable selectivity by controlling the surface shape of the hyperspheroidal volume.

Another object of the present invention is to provide a neural network incorporating difference neurons for enhanced discriminant performance.

Another object of the present invention is to provide a multilayer neural network wherein all neurons are difference neurons.

Another object of the present invention is to provide a digital implementation of a difference neural network resulting in a denser implementation as compared with standard MP neurons.

Accordingly, an artificial neuron is described based on the use of distance metrics. Unlike the conventional McCulloch-Pitts (MP) neuron which forms a nonlinear function of the vector dot product of the input signal vector and a weighting vector, a difference neuron forms a nonlinear function of the vector difference between the input signal vector and a reference vector. A variety of distance metrics and nonlinear functions are discussed. Distance metrics include the generalized Minkowski distance functions that naturally lead to generalized hyperspheroidal discriminant functions. A method for controlling the discrimination selectivity by means of an offset to the distance metric prior to forming the output discrimination function is described. Also, output nonlinear functions with both odd and even symmetry are described. The difference type neurons are incorporated into multi-neuron networks.

In one preferred embodiment, the feedforward neural network consists of at least one layer of parallel difference neurons. Typically, each neuron of the first layer is richly interconnected with the input signal vector and with its own reference vector. The set of outputs of each difference neuron of the first layer constitutes an output vector which may be used as the input signal vector to a second neuronal layer or may be used as the final output vector. When a second layer is used, each of its neuron cell will also have an associated reference vector. In this manner, multilayer network can be constructed, each subsequent layer using the prior layer output vector as its input vector. The output of the final layer becomes the network output layer.

An adaptive feedforward difference neural network is described that is capable of learning (adapting) the constituent values of its associated reference vectors so that the output of the adapted network behaves, in a statistical sense, in accordance with the target patterns used in "training" of the network. Training or adaptation is accomplished by comparing the trial output, caused by a given input vector (pattern), to a target (desired) pattern; generating an error metric; and applying suitable adjustments to the associated reference vectors so as to minimize the response error. Accordingly, an adaptive control method and apparatus to adjust the reference vector values based this training procedure is described. The same control system may be used to configure and control the operation of the neural network.

A feedback neural network employing the feedforward neural networks is also described.

BRIEF DESCRIPTION OF THE DRAWINGS

The novel features believed characteristic of the invention are set forth in the appended claims. However, the invention itself, as well as other features and advantages thereof, will be best understood by reference to the description which follows in conjunction with the accompanying drawings briefly described below.

FIG. 1 shows a typical prior art McCulloch-Pitts (MP) neural cell.

FIG. 2a, 2b and 2c show three typical nonlinearities used in MP neurons.

FIG. 3a, 3b and 3c show various 2-dimensional discriminant functions.

FIG. 4 is a functional block diagram of a difference neuron.

FIG. 5 shows a parameterized set of generalized 2-dimensional hyperspheroids (circles).

FIG. 6a, 6b and 6c show representative difference neuron output nonlinearities and the corresponding discriminant functions.

FIG. 7 shows a block diagram of a two layer difference neural network.

FIG. 8 shows a multiplexed analog difference neural network.

FIG. 9 shows a currently preferred embodiment of a difference type multiplexed analog neuron.

FIG. 10 shows a multiplexed digital difference neural network.

FIG. 12 shows a functional block diagram of the adaptive neural network and control system.

FIG. 13 is a flow diagram depicting an adaptation method.

FIG. 14 shows a feedback network using difference type neurons.

FIG. 15 is a flow diagram depicting a method for generating reference vectors for a feedback network.

DETAILED DESCRIPTION

1. Introduction-(MP Neuron)

Figure 11:
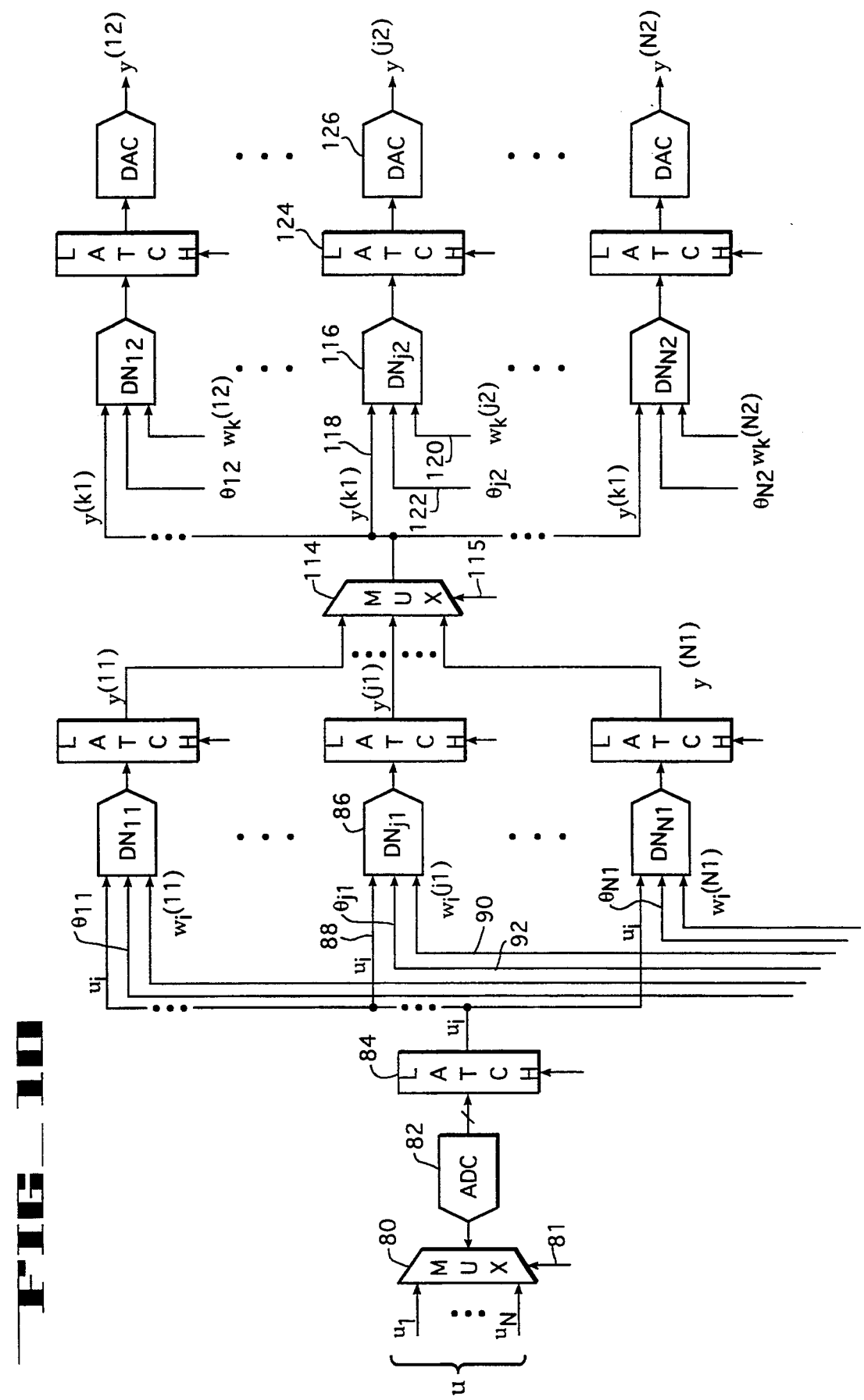
FIG. 11 shows a currently preferred embodiment of a difference type multiplexed digital neuron.

The neuron model of McCulloch and Pitts (MP) has been prominent in the art of artificial neural cells and networks. FIG. 1 shows a functional block diagram of a typical MP cell. The input signal vector u, consists of a parallel set of signal levels, $(u_1, \ldots u_N)$, applied to input terminals 1 through N, each applied to a weighting means 10 so as to produce at each weighting means output a set of signal values representative of the products $w_1u_1, w_2u_2, \ldots, w_Nu_N$. These product terms are summed at adder 12 to produce a sum term representative of the vector dot product $$w^T u = \sum_{i=1}^{N} w_i u_i$$

$$u = [u_1 u_2 \ldots u_N]^T$$

where $$w = [w_1 w_2 \ldots w_N]^T$$

and superscript T represents the transpose operator. The output of adder 10 also includes an offset term, $-\theta$, which is applied to adder 10 input. The offset term is also referred to as a threshold value. The complete adder 10 output, $$w^T u - \theta = \sum_{i=1}^{N} w_i u_i - \theta,$$

is applied to a nonlinear transfer means 16 producing an output signal y, where $$y = f(w^T u - \theta)$$

Typical nonlinear transfer characteristics used in MP type neural cells are shown in FIG. 2. They include a signum function or hard-limiter in FIG. 2a, a linear threshold logic operator in FIG. 2b and a sigmoidal function or "soft" limiter in FIG. 2c. Schematic representations often combine the summer 12, offset 14, and nonlinear transfer means 16 into a single nonlinear computational or processing element (PE) 18.

A useful way to qualify artificial neurons is by their ability to logically separate or categorize a vector space. For example, consider a two dimensional MP neuron of the type shown in FIG. 1. The output of adder unit 12 would be $$W^T u - \theta = w_1 u_1 + w_2 u_2 - \theta$$

Consider this sum being applied to output nonlinearity 16, a signum nonlinearity as shown in FIG. 2(a). The output, y, would be $$y = \text{sgn}\{w_1 u_1 + w_2 u_2 - \theta\}$$

Further, $$y = \begin{cases} +1, & \text{if } w_1 u_1 + w_2 u_2 - \theta > 0 \\ -1, & \text{otherwise.} \end{cases}$$

This implies an ability to distinguish two regions of the $(u_1, u_2)$ plane. The border line between the two regions is represented by a line satisfying the condition, $y=0$, or $$0 = w_1 u_1 + w_2 u_2 - \theta$$

Solving for $u_2$ obtains $$u_2 = \frac{w_1}{w_2} u_1 + \frac{\theta}{w_2}$$

a linear equation in the $(u_1, u_2)$ plane with a slope of $-(w_1/w_2)$ and an ordinate offset of $$\frac{\theta}{w_2}$$

as shown in FIG. 3(a). The shaded half plane corresponds to the values of $(u_1, u_2)$ that result in the argument of the signum function being less than zero, i.e., $$w_1 u_1 + w_2 u_2 - \theta < 0$$

$$w_1 u_1 + w_2 u_2 < \theta$$

or

The nonlinearities of FIGS. 2(b) and 2(c) would similarly tend to separate the plane into two regions except with a "fuzzier" transition region. The threshold logic nonlinearity of FIG. 2(b) a limiter with a two state output and a linear transition region. The sigmoid of FIG. 2(c) is a soft limiter with an approximately linear region for small ($\sim$0) inputs. However, it is often the nonlinearity of choice because its "smoothness" ensures differentiability, an important characteristic for adaptation strategies such as the well known backpropagation algorithm.

If the above analysis were to be extended to three dimensions, the boundary conditions would be $$w_1 u_1 + w_2 u_2 + w_3 u_3 = \theta$$

This is a linear equation in three-space representing a plane bisecting that space. Introducing additional dimensions, say, to N-space, this would result in a hyperplane of N-1 dimensions bisecting its applicable space.

2. Difference Neurons

FIG. 4 is a functional block diagram of a preferred embodiment of a difference neuron. Unlike the MP neuron model based on the vector dot-product, $w^T u$, this neuron is based upon the vector difference between an input vector, u, and a reference vector, w, and a metric or distance function s(u,w), representing that difference (Korn and Korn, Mathematical Handbook for Scientists and Engineers, McGraw-Hill, 1961, pg. 345, sec. 12.5-2). Referring back to FIG. 4, input lines 21 convey each element of input vector $u = (u_1, u_2, \ldots u_N)$ to a difference unit, typically represented by unit 25. Also, input lines 23 convey the elements of the reference vector $w = (w_1, w_2 \ldots w_N)$ to corresponding terminals of difference units 25 to form the vector difference $$u - w = [(u_1 - w_1), (u_2 - w_2), \ldots, (u_N - w_N)]$$

which appears at the input to distance function generator (DFG) 26.

DFG 26 may take on a variety of nonlinear transfer characteristics, depending upon the specific distance metric selected.

All of these metrics, s(a,b), satisfy the following conditions $s(a,a) = 0$;
$s(a,b) \leq s(a,c) + s(b,c)$, (triangle property); which further imply
$s(a,b) > 0$; and
$s(a,b) = s(b,a)$.

A generalized distance function is the Minkowski $n^{th}$ order metric given by $$s_n(a, b) = \left[ \sum_k |a_k - b_k|^n \right]^{\frac{1}{n}}$$

where vector $a = [a_1, a_2, \ldots, a_N]^T$
$b = [b_1, b_2, \ldots, b_N]^T$

Interesting special cases include the first order Minkowski distance function, $s_1(a,b)$, also known as the "city block" metric, $$s_1(a, b) = \sum_k |a_k - b_k|$$

and the second order function, $s_2(a,b)$, also known as the Euclidean metric, $$s_2(a, b) = \left[ \sum_k |a_k - b_k|^2 \right]^{\frac{1}{2}}$$

It should be noted that integer and fractional powers of the Minkowski distance metric, for example $$s_2^2(a, b) = \sum_u |a_k - b_u|^2,$$

also satisfy the above conditions defining a distance metric.

Thus, the purpose of DFG 26 is to transform the vector difference, (u-w), generated by the difference elements 25 into a suitable distance function that represents an absolute value measure of the separation between the input vector, u, and the reference vector, w. The output, s(u,w), is added to the offset, $-\theta$, at adder 27 and passed on to output nonlinearity means (ONL) 28.

In order to compare and distinguish the advantages of the difference neurons versus the MP neuron, an examination of the ability of difference neurons to separate space will be examined. Consider, as before, a two dimensional space. Let the input to output nonlinearity (ONL) 28 be $$s(u, w) - \theta m = \sum_{m=1}^{2} |u_1 - w_1|^m - \theta_m,$$

the $m^{th}$ power of an $m^{th}$ order Minkowski type of distance metric offset by $\theta_m$. Further, let ONL 28 be a hard-limiting nonlinearity as shown in FIG. 2(a). The $(u_1, u_2)$ plane will be separated into two regions as indicated by $$y = \begin{cases} +1, \text{ for } \sum_{m=1}^{2} |u_i - w_i|^m - \theta_m > 0 \\ -1, \text{ for } \sum_{m=1}^{2} |u_i - w_i|^m - \theta_m < 0 \end{cases}$$

The locus of points forming the boundary between the two regions is given by $$|u_1-w_1|^m + |u_2-w_2|^m = \theta m$$

If m=2, the above expression yields a quadratic equation, $$|u_1-w_1|^2 + |u_2-w_2|^2 = \theta_2,$$

representing a circle centered at $(w_1 w_2)$ with a radius of $\sqrt{\theta_2}$ as shown in FIG. 3(b). The shaded portion represents $|u_1-w_1|^2 + |u_2-w_2|^2 < \theta_2$ If m=1, then $|u_1-w_1| + |u_2-w_2| = \theta_1$, which is plotted in FIG. 3(c). If we normalize the equation representing the boundary between the two regions by dividing through by $\theta_m = \theta^m$, then $$\left|\frac{u_1 - w_1}{\theta}\right|^m + \left|\frac{u_2 - w_2}{\theta}\right|^m = 1$$

defines the boundary. This equation may be considered to be a generalized $m^{th}$ order circle for integer as well as fractional value of m. The resulting $m^{th}$ order circles for $m = \frac{1}{3}, \frac{1}{2}, 1, 2, 3, 4$ are plotted in FIG. 5.

As previously discussed, this two dimensional example may be extended so as to include higher dimensional space so that for the class of metric chosen generalized circles become generalized spheres which, in turn, become generalized N-dimensional hyperspheres.

It is important to note that the difference neuron, as described above, has a significantly improved discrimination capability by using the offset, $\theta$, to adjust the radius of the hypersphere and by locating its center through the choice of reference weights $\{w_i\}$. In addition, the "shape" of the hyperspace is adjustable by selecting the appropriate distance metric.

FIGS. 3(b) and 3(c) show that the locus of points satisfying the equation $s_m(u, w) = \theta^m$ encloses a negative valued region for $s_n(u, w) - \theta^m < 0$. Thus, output nonlinearity (ONL) 28 of FIG. 4 may be advantageously selected to provide the requisite $m^{th}$ order radially symmetric discriminant function. For example, consider the three examples shown in FIG. 6. Each example consists of a nonlinear transfer characteristic on the left and its corresponding two dimensional discriminant surface on the right. FIG. 6(a) represents the two-dimensional hardlimiting case; FIG. 6(b), a gaussian bell case; and FIG. 6(c) a two annular ring case. These examples are not exhaustive, but only suggestive of the vast choices available.

3. Difference Neural Networks

The difference neurons of the type described above and shown in FIG. 4 may be interconnected to form a difference neural network of one or more layers. FIG. 7 shows an example of a fully interconnected two layer difference neural network. The input vector, u, having N constituent components $(u_1, u_2, \ldots u_N)$ is applied to input lines 31 which are each connected to the N input lines 21 at each first layer difference neuron 20. Neurons DN-11 through DN-N1 constitute the first layer. In addition, each neuron, DN-i1, also receives as an input a reference vector $w^{(i1)}$ and forms an output $y^{(i1)}$.

The combined output, $(y^{(11)}, y^{(21)}, \ldots, y^{(N1)})$, forms a first layer output vector, $y^{(1)}$, where $$y^{(1)} = (y^{(11)}, y^{(21)} \ldots, y^{(N1)})$$

which is, in turn, applied to the second neural layer, comprising neurons DN-12 through DN-N2, together with its corresponding set of difference vectors $(w^{(12)}, w^{(22)}, \ldots, w^{(N2)})$ to form a second layer output vector $$y^{(2)} = (y^{(12)}, y^{(22)}, \ldots, y^{(N2)})$$

Clearly, additional layers may be added to the network shown in FIG. 7 by treating the $k^{th}$ layer output vector, $y^{(k)}$, as the input to the $(k+1)^{th}$ neural layer. Also, although N neurons are shown in each layer, a particular implementation may use more or less than N neurons in any layer. Similarly, any particular neuron may be less than fully connected to all available input and reference vector elements. In this sense, absence of a neuronal output is equivalent to lack of any input or reference vector connection.

The response of this network to any input vector, u, is controlled by the values stored in the reference vectors, $w^{(ik)}$, and the type of nonlinearities used in PE unit 29, as shown in FIG. 4 and previously described. The method for training, i.e., assigning values to elements of reference vectors, $w^{(ik)}$, is discussed in Section 4.

One preferred embodiment for a difference neural network, shown in FIG. 8, features multiplexing as a means for reducing the number of components, cost and physical size. FIG. 9 shows a multiplexed difference neuron structure for use in the network of FIG. 8.

Referring to FIG. 8, the input vector, u, is applied to the input of MUX 40 which is used to select one out of N input levels, $u_i$, by means of select control 41 and apply the selected level to each first layer neuronal input typically labeled 42. A corresponding value of the appropriate reference vector $w_i^{(j1)}$ is applied to the reference input 44 of the $j^{th}$ neuron, for $j = 1, 2, \ldots, n$. The $i^{th}$ value of vector $w^{(j1)}$, $w_i^{(j1)}$ is generated by digital to analog converter (DAC) 48 based on the digital code provided to its input 49. In this manner, the $j^{th}$ value of first layer output vector is made available to MUX 60 that controls the selection of one out of N values of first layer output vector $y^{(1)}$ as the input to the second neural layer.

Referring to FIG. 9, the vector elements $u_i$ and $w_i^{(jn)}$ on input lines 42 and 48, respectively, are differenced by element 54 to form the difference vector component $u_i - w_i^{(jn)}$. DFG 26 forms a distance metric, as previously described with reference to FIG. 4. Its output is accumulated in integrator 56. Clear control 57 of unit 56 is provided so that prior to accumulating the first DFG 26 output value, corresponding to the difference value $u_1 - w_1^{(jn)}$, integrator 56 may be cleared (zeroed). In this manner, the N values out of DFG 26 are accumulated in order to form the required sum. For example, the sum corresponding to the $k^{th}$ order Minkowski distance metric $$s_k(u, w^{(jn)}) = \left[ \sum_{j=1}^{N} |u_i - w_i^{(jn)}|^k \right]^{\frac{1}{k}}$$

or the sum $\Sigma |u_i - w_i^{(jn)}|^k$ corresponding to the $k^{th}$ power of the $k^{th}$ order Minkowski distance metric. The output of integrator 56 is added to the offset, $-\theta$, by adder 58 and passed on to ONL 28 that performs any additionally required nonlinear transformations to yield the output value $y^{(j1)}$ corresponding, in general to the $j^{th}$ component of the first neural network layer.

Neuron 64, DAC 68 and input 69, DAC 70, and input 71 play analogous roles in layer number two as neuron 44, DAC 48, input 49, DAC 50 and input 51, respectively, in the operation of layer number one, yielding an output vector $y^{(2)} = (y^{(12)}, y^{(j2)}, \ldots, y^{(N2)})$ as required. Clearly, this structure may be extended to as many layers as desired. Also, further economies suggest themselves by using additional multiplexing of, say, DAC units.

FIGS. 10 and 11 are digital versions of the multiplexed analog network of FIG. 8 and multiplexed difference neuron of FIG. 9, respectively.

Referring to FIG. 10, analog input vector u is applied to MUX 80 and its individual elements, $(u_1, u_2, \ldots, u_N)$ are sequentially supplied by select control 81 to analog to digital converter (ADC) 82. The output, $u_i$, of ADC 63 is temporarily stored in latch 64 and fed, in parallel, to the first layer of multiplexed neurons, typically represented by unit 86. Reference vector elements $w^{(j,1)}$ are sequentially supplied at input 90.

The structure of a typical multiplexed digital neuron 86 is shown in FIG. 11. The corresponding $i^{th}$ elements of vector u and $w^{(jn)}$ are applied to input lines 88 and 90 respectively of unit 94 to yield the difference term $u_i - w_i^{(jn)}$ which is applied to unit 96 which forms, by way of example, the first order Minkowski metric $$s_1(u, w_l^{(jn)}) = \sum_{i=1}^{N} |u_i - w_l^{(jn)}|$$

at its output. Unit 96 operates as follows: the output of difference unit 94 is temporarily stored in latch 98; DEMUX unit 100 switches the contents of latch 98 to negate unit 102 by means of line 101 if the msb of latch 98 indicates a negative value. Otherwise, latch 98 is connected to accumulator 104 directly. Accumulator 104 sums the resulting positive values, having been initially cleared by clear control 106 and adds the sum to the offset, $-\theta$, provided on line 92, in adder 108. ONL ROM 110 is a read only memory whose contents are addressed by adder 108 output causing its output to correspond to element $y^{(j1)}$, the $j^{th}$ component of vector $y^{(1)}$. Each of the N neurons of the first layer similarly produce their corresponding elements of $y^{(1)}$. The output of neuron 86 is stored in latch 112 and made available to MUX 114 while the next component value is computed.

The N vector components are selectable by means of MUX 114 and select control 115 for application to the second neuron, Neuron 116 being representative of the neurons in the second layer. Neuron 116 is structure like unit 86, accepting $y^{(1)}$ as an input vector on line 118 and $w^{(j2)}$ as the corresponding reference vector. Its output is placed in latch 124 for outputting either as a digital value or through DAC 126 for analog output. Clearly, additional layers could be added by repeating the structure of the second layer.

4. Neural Network Control and Adaptation

FIG. 12 shows a system for controlling, configuring and adapting a neural network. The system comprises a neural network 102, with an input vector selectively applied on input lines 21 by selector (MUX) 103 that is connected to input lines 105 and to input vector generator 108; a comparator 106 for comparing neural network 102 output vector, $y^{(n)}$, on lines 110 with the output target vector, t, provided on lines 101 by output target generator 112. Control processor 104 accepts the error signal generated by comparator 106 on line 107 and computes a new set of reference weights and offsets used by neural network 102. Storage is provided in processor 104 for storing exemplar input and exemplar target vectors for driving input generator 108 and output generator 112, respectively.

Control processor 104 is also used for configuration by means of input terminal 105. Configuration parameters typically may include initial values for reference vectors and offset, number of input/output lines, and the number of layers in the network.

Any of several adaptation algorithms may be employed for difference neural networks including the method of least squares and the steepest descent method.

The method of least squares is based on minimizing a quadratic cost function, D, with respect to a set of variable parameters. In this case, the set of parameters are the reference vector weights and offsets. For example, the cost function may be taken to be the inner (dot) product of the error vector, $$D = (y^{(n)} - t)^T (y^{(n)} - t)$$

where $y^{(n)}$ is the neural network output vector, and t is the target vector. If a variety of output and target vectors are used, then the sum over p, the ensemble index, may be used so that $$D = \sum_{p} ({}_{p}y^{(n)} - {}_{p}t)^T ({}_{p}y^{(n)} - {}_{p}t)$$

where ${}_{p}y^{(n)}$ is the neural network response to the $p^{th}$ input vector, and ${}_{p}t$ is the $p^{th}$ target vector.

The cost function is minimized by forming the gradient of the cost function with respect to the $q^{th}$ layer parameter vector, $v^{(q)}$, where $$v^{(q)} = [v^{(1q)} v^{(2q)}, \ldots, v^{(Nq)}]^T$$

and $$v^{(mq)} = [w^{(mq)}, \theta^{(mq)}]^T = [w_1^{(mq)}, w_2^{(mq)}, \ldots w_N^{(mq)}, \theta^{(mq)}]^T$$

The vector $v^{(mq)}$ represents the reference vector and its associated offset, $\theta^{(mq)}$, of the $m^{th}$ neuron in the $q^{th}$ layer. Thus, the system of equations defined by setting the gradient of D to zero, or $$\frac{\partial D}{\partial v^{(mq)}} = \left[ \frac{\partial D}{\partial w_1^{(mq)}}, \frac{\partial D}{\partial w_2^{(mq)}}, \ldots \frac{\partial D}{\partial w_N^{(mq)}}, \frac{\partial D}{\partial \theta^{(mq)}} \right]^T = 0,$$

implicitly define the least squares solution to the parameter selection process. Because the input/output relationships of the neurons are nonlinear, there are no general analytic solutions for the vector $v^{(mq)}$, and iterative approximation techniques must be applied, such as the commonly used method of steepest descents. The neural network training algorithm called 'backpropagation' is an example of such a method.

The method of steepest descent comprises the following step:

(1) assign initial values to the parameters
(2) compute the approximate gradient of the cost function, D
(3) change the parameters incrementally by a factor, $\epsilon$, in the direction of the gradient
(4) stop the process if the cost function is minimized or if some other convergence criteria (such as a test of magnitude, $\eta$) is achieved, or else go back to (2).

In order to ensure convergence of the cost function, $\epsilon$ and $\eta$ are changed with each iteration of the descent procedure. This limit value may also be reduced after each successful trial. Thus, $$\eta_k < \eta_{k-1}$$

and $$\epsilon_r < \epsilon_{r-1}$$

FIG. 13 is a flow diagram of a preferred adaptation process, 200, which is initialized by setting the values $\epsilon = \epsilon_0$, $\eta = \eta_0$, and the tally count = 0. Step 202 initializes the exemplar index to p=1. The $p^{th}$ exemplar vector pair is selected in step 204. Step 206 tests for convergence by checking if the peak error of (y−t) is less than $\eta_k$, and if so, the process advances to test 212. Otherwise, the failure is noted by incrementing the tally count in step 208 and adjusting the weights of vector $\langle \rangle_r$ at step 210. At step 212, the input/output ensemble index, p, is checked to determine if all exemplar cases have been used. If so, the process advances to step 216; otherwise index p is incremented in step 214 and the process returns to step 204.

Step 216 monitors the convergence of vector $y^{(n)}$ to the target vector t by calculating the cumulative square error over all exemplars using the cost function, D. D is compared with the smallest value of the cost function, $D_{min}$, thus far obtained during preceding iterations. If D exceeds $D_{min}$ by some predetermined criterion, such as by a factor of 1.2, then the process proceeds to step 218. In this step, $\epsilon$ and $\eta$ are decremented by a constant factor, say $\frac{2}{3}$, and the weights $v^{(mq)}$ at $D_{min}$ are restored. Control is passed to step 202. If the criterion on D is not satisfied, the procedure advances to step 220. If no failures have occurred in the test step 206, then tally=0 and the process advances to test step 222, where $\epsilon$ and $\eta$ are decremented. Control is then passed to step 202. If there have been failures at 206, then tally>0 and control is passed from 220 to 224 where overall convergence of D is measured. If the rate of decrease of D falls below some user preset value, e.g. 1 part per thousand per iteration, the descent procedure is deemed to have converged and the process ends. Otherwise, the process returns to step 202.

5. Feedback Neural Networks

The difference neuron of FIG. 4 can be incorporated in a feedback network as well as in feedforward network discussed above. FIG. 14 is an example of a neural feedback network that is topologically similar to the network credited to Hopfield (J. J. Hopfield, "neural Networks and Physical Systems with Emergent Collective Computational Abilities". *Proc. Natl. Acad. Sci. USA*, Vol. 81, 3088-3092, May 1984). It differs from the Hopfield network because it employs difference neurons rather than McCulloch-Pitts type neurons. Feedback structures of this type are particularly useful for use as associative or content addressable memories for the restoration of noise corrupted or incomplete input patterns.

Referring to FIG. 14, this network embodiment comprises a single layer of N digital type difference neurons, $DN_1$ through $DN_N$, typified by difference neuron 302. The input vector to the $j^{th}$ neuron, $DN_j$, comprises the N-1 outputs $y_i(k)$ but not including $y_j(k)$. Also, the reference and offset vector, $v_j$, is applied at input terminals 310. The output of each neuron is binary (0, 1) and is temporarily stored in an output latch such as latch 304 at the output of the $j^{th}$ neuron, 302. Output latches, such as 304, provide the component elements of each neuron input vector $u^{(j)}(k)$, where $$u^{(j)}(k) = [y_1(k), y_2(k), \ldots y_{j-1}(k), y_{j+1}(k), \ldots, y_N(k)]^T$$

and k is the time or interaction index. The network is initialized by storing the initial output vector, $y^{(0)}$, in the set of output latches of which latch 304 is representative.

Each neuron computes an output representative of $$y_j(k+1) = g\left\{ \sum_{\substack{i=1 \\ i \neq j}}^{N} |u_i(k) - w_i^{(j)}| - \theta_j \right\}$$

where N is the number of neurons, where $w_i^{(j)}$ is the $i^{th}$ component of the reference vector, $w^{(j)}$, and $\theta_j$ is its associated offset value. The function g{.} represents the operation performed by output nonlinearity (ONL) 28 of FIG. 4. In this particular embodiment, ONL 28 is usually chosen to have either a hard limiting or sigmoidal transfer characteristic. The offset or radius parameter, $\theta_j$, is set at N/2.

After a number of iterations, the output vector, y, converges to one of a set of stable forms representative of the set of possible uncorrupted and complete input patterns. This determination is based on a set of previously derived reference vectors. The flow diagram of FIG. 15 shows a method for determining the set of reference vectors from a set of P binary valued exemplar vectors, $\{t^{(P)}\}$, of N elements. Each vector element is either 1 or 0.

Although the above operating description implies synchronous operation of the digital network, it should be noted that asynchronous operation with each neuron operating on an independent clock would lead to similar results.

The process 400 is initialized by setting the exemplar index p=1. In step 402, the $p^{th}$ exemplar, $t^{(p)}$, is selected from the set of P and passed on to step 404 wherein an N×N correlation matrix, J, with elements $J_{ij}$ is calculated by first removing the exemplar mean value as follows $$J_{ij} = \sum_{p=1}^{P} (2t_i^{(p)} - 1)(2t_j^{(p)} - 1),$$

where $t_i^{(p)}$ is the $j^{th}$ element of the $p^{th}$ exemplar vector. Test step 406 tests to see if all P exemplars have been used to form matrix J and if so the process passes on the step 410. Otherwise, index p is incremented and the next exemplar is selected in step 402.

In step 410, the elements of matrix J are searched for the maximum magnitude, $|J_{max}|$, which is then used in step 412 to compute the vector components, $w_i^{(j)}$, in a suitable format, as follows:

$$w_i^{(j)} = \frac{1}{2}[1 - J_{ij}/|J_{MAX}|]$$

where $w_i^{(j)}$=represents the $i^{th}$ component of the $j^{th}$ reference vector. Upon completion and storage of these results, the process is terminated at step 414.

The feedback network described above using a hard limiting ONL 28, i.e., $$g(x) = 2 \text{ signum } \{x\} - 1$$

has the retrieval properties identical to the original Hopfield model. If, instead, a sigmoidal transfer characteristic such as $$g(x) = \frac{1}{1 + e^{-\gamma x}}$$

were to be employed, the retrieval properties would be degraded with decreasing positive values of $\gamma$.

In the foregoing specification, the invention has been described with reference to specific exemplary embodiment thereof. It will, however, be evident that various modifications and changes may be made thereto without departing from the broader spirit and scope of the invention as set forth in the appended claims. The specifications and drawings are, accordingly, to be regarded in an illustrative, rather than restrictive, sense.

What is claimed is:

1. A difference type artificial neuron cell comprising:
   a) a distance value generating circuit for generating a distance signal value representative of the distance between an input signal vector and a reference signal vector comprising:
      i) a subtraction circuit for forming a difference vector signal representative of the difference between corresponding elements of said input vector signal and said reference vector signal;
      ii) a second nonlinear circuit connected to the output of said subtraction circuit for forming a set of unipolar signals from the elements of said difference vector signals representative of the magnitude of said difference distance victor; and
      iii) an accumulator circuit for accumulating said unipolar signals from the output of said first nonlinear circuit to form said distance value signal;
   b) a subtraction circuit for forming a combined signal by subtracting an offset magnitude signal from said distance signal value for controlling the radius of the neuron cell hyperspherioidal discriminant function surface; and
   c) first nonlinear circuit for mapping said combined signal value to a value representative of a prescribed discriminant function.

2. A neuron as in claim 1 wherein said second nonlinear means is an absolute magnitude circuit.

3. A neuron as in claim 1 wherein said second nonlinear means is a square-law device.

4. A neuron as in claim 1 wherein said second nonlinear means is an $n^{th}$ order device.

5. A neuron as in claim 1 wherein said distance value generating circuit is a Minkowski norm generator wherein said second nonlinear circuit comprises a noninteger power law circuit.

6. A neuron as in claim 1 wherein said distance value generating circuit and said first nonlinear circuit are digital circuits.

7. A neuron as in claim 6 wherein said first nonlinear circuit is a read-only-memory.

8. A neuron as in claim 1 wherein said first nonlinear circuit is representative of a sigmoidal function.

9. A neuron as in claim 1 wherein said first nonlinear circuit is representative of a linear threshold logic operator.

10. A neuron as in claim 1 wherein said first nonlinear circuit is representative of a gaussian bell function.

11. An artificial feedforward neural network configured to accept an input data vector comprising a first neuron layer which is comprised of at least one difference type neuron, each neuron connected to at least one of the signal elements of an input vector resulting in an output vector wherein the constituent elements of said output vector are at least one of the set of neuronal outputs, said difference type neuron comprising a distance value generating circuit for generating a distance signal value representative of the distance between said input signal vector and a reference signal vector, a subtraction circuit for forming a combined signal by subtracting an offset magnitude signal from said distance signal value for controlling the radius of said difference type neuron hyperspheroidal discriminant function surface, and a first nonlinear circuit for mapping said combined signal value to a value representative of a prescribed discriminant function.

12. A neural network as in claim 11 wherein each said difference neuron is fully connected to each element of the input vector.

13. A neural network as in claim 12 further comprising:
   a) at least one additional neuron layer comprised of at least one difference type neuron wherein said first layer output vector is selectively connected to the input of the second layer; and
   b) subsequent neuron layers comprised of at least one difference type neuron with inputs that are selectively connected to the preceding neuron layer outputs.

14. A method for training a feedforward difference neural network, the difference neural network including at least one layer of difference type neural cells, each difference type neural cell having a distance value generating circuit for generating a distance signal value representative of the distance between an input signal vector and a reference signal vector, a subtraction circuit for forming a combined signal by subtracting an offset magnitude signal from the distance signal value, and a first nonlinear circuit for mapping the combined signal value to a value representative of a prescribed discriminant function, the training method comprising:
  a) simulating a feedforward difference neural network using a computer model that is an image of the feedforward difference neural network that is to be trained;
  b) initializing each difference neuron reference vector and offset component circuit values with random values;
  c) connecting exemplar input vector component signals to the simulated difference neural network input;
  d) comparing resulting output vectors with corresponding exemplar output vectors to obtain an error measure;
  e) calculating values of cost functions from said comparisons;
  f) estimating gradients of said cost functions relative to each said neuronal reference vector and offset;
  g) incrementally changing each said reference vector and offset circuit values in the direction of said gradients; and
  h) comparing said error measure with a predetermined value, advancing the method to step (i) if less than the predetermined value, otherwise returning to (c) for a new iteration;
  i) outputting each said reference vector and offset circuit values of the trained feedforward neural network in step (g); and
  j) creating a feedforward difference neural network with reference vector and offset circuit values corresponding to the simulated neural network of step (g).

15. The method as in claim 14 wherein a fractional portion of said gradient is applied to said reference vector and offset values.

16. The method as in claim 15 wherein the step of calculating values of cost functions further comprises:
  a) storing said cost function values;
  b) comparing sequential values for determining if error cost is increasing and, if so, replacing current reference vector and offset values with the prior set of circuit values, and reducing the value of said fractional portion of gradient applied.

17. The method as in claim 15 further comprising the steps of:
  a) counting the number of exemplars that result in said error measure exceeding a specified limit; and
  b) reducing said fractional portion of gradient and said limit if said count is zero.

18. The method as in claim 15 further comprising the step of comparing the rate of reduction of said cost function and if less than a predetermined amount terminating the process.

19. A feedforward difference neural network control and adaptation apparatus comprising:
  a) a difference neural network which includes at least one layer of difference type neural cells, each difference type neural cell having a distance value generating circuit for generating it distance signal value representative of the distance between an input signal vector and a reference signal vector, a subtraction circuit for forming a combined signal by subtracting an offset magnitude signal from distance signal value for controlling the radius of each said neuron cell hyperspheroidal discriminant function surface, and a first nonlinear circuit for mapping combined signal value to a value representative of a prescribed discriminant function;
  b) a computer controllable exemplar input vector generator for supplying at least one exemplar input vector, connected to said neural network input;
  c) a computer controllable output exemplar vector generator for generating the desired network response vector to the corresponding input exemplar vector;
  d) vector comparator means for producing a signal at its output representative of a vector difference, with a first and second input port, said first input connected to the output of said neural network and said second input connected to the output of said exemplar vector generator; and
  e) a control computer connected to said comparator output for initializing and adjusting the elements of a set of reference vectors and offsets, one set for each neuron of said neural network, in accordance with a prescribed procedure using said comparator output, said control computer connected to both said exemplar input and output vector generators for controlling the generation and selection of corresponding exemplar input and output vector pairs.

20. Apparatus as in claim 19 wherein said control processor controls said input and output exemplar vector generators.

21. Apparatus as in claim 20 wherein said control processor further comprises input means for configuration and initialization control.

22. Apparatus as in claim 21 wherein said control processor further comprises memory for storing of exemplar vectors.

23. Apparatus as in claim 22 wherein said control processor further comprises memory for storing previous cost function values and associated reference and offset data for retrieval, if required.

24. A feedback difference type neural network comprising:
  a) a feed forward difference type neural network comprising of at least one neural layer, having input signal terminals for accepting an input data vector and output signal terminals for outputting a response vector with at least one output signal terminal connected to at least one input terminal, said neural layer comprising at least two difference type neurons, each said difference type neuron comprising a distance value generating circuit for generating a distance signal value representative of the distance between said input data vector and a reference vector, a subtraction circuit for forming a combined signal by subtracting an offset magnitude signal value from said distance signal valise for controlling the radius of said difference type neuron hyperspheroidal discriminant function surface, and a first nonlinear circuit for mapping said combined signal value to a value representative of a prescribed discriminant function; and
  b) signal storage circuits coupled to said input signal terminals for initializing the state of the input data vector of said feedforward difference type neural network.

25. A feedback artificial network as in claim 24 wherein said feedforward difference type neural network is configured to accept a multichannel input vector comprising a first neuronal layer which is comprised of at least one difference type neuron selectively connected to the signal elements of an input data vector resulting in an output vector wherein the constituent elements of said output vector are at least one of the set of neuronal outputs.

26. A feedback artificial network as in claim 25 wherein said feedforward difference type neural network is fully connected to each element of the input data vector.

27. A feedback artificial network as in claim 26 wherein said feedforward difference type neural network further comprises:
   a) at least one additional neuron layer of difference type wherein said first layer output vector is selectively connected to the input of the second layer; and
   b) subsequent neuron layers of difference type neurons having inputs that are selectively connected to the preceding neuron layer outputs.

28. An apparatus for determining reference vectors and associated offsets by adjusting reference vector component values and offset values for a feedback difference type neural network comprising:
   a) a feedback difference type neural network comprising difference type neurons with computer adjustable reference vector component and corresponding offset values; and
   b) a control computer for computing a correlation matrix from a set of prescribed response output exemplar vectors, for normalizing the component values of said matrix by use of the maximum correlation value in said matrix, the columns of said matrix being the reference vectors including associated offsets, said control computer also coupled to said difference type neural network for adjusting said reference vector component and corresponding offset values.

29. The apparatus of claim 28 for determining reference vector component values and offsets further comprising means for subtracting the mean value of said exemplar output vectors from each said exemplar output vectors by use of said control computer.

30. A multiplexed difference type neuron comprising;
   a) an input connector for accepting an input data vector, said input vector elements arranged in serial order;
   b) an input connector for accepting a reference vector, said reference vector elements arranged to correspond to the order of said input vector elements serial order;
   c) a vector differencing circuits for forming the difference between said corresponding input vector and said reference vector elements;
   d) a distance value generating circuit connected to said differencing circuit output for forming an output value representative of the distance between said input vector and said reference vector;
   e) a subtraction circuit, connected to the output of said distance value generating circuit and to an offset magnitude input signal for forming a combined output signal value by subtracting said offset magnitude input signal from said distance value signal for controlling the radius of the neuron cell hyperspherical discriminant function surface; and
   f) a first nonlinear circuit for mapping said combined value signal to a value representative of a prescribed discriminant function.

31. A neuron as in claim 30 wherein:
   a) said vector differencing circuit is a digital subtracting circuit;
   b) said distance value generator circuit comprises an absolute magnitude digital circuit with said absolute magnitude current input connected to the output of said differencing circuit and said absolute magnitude circuit output being a digital signal representative of the absolute magnitude of this input signal, and a digital accumulator circuit with its input connected to said magnitude digital circuit output for accumulating a signal representative of the distance between said input vector and said reference vector;
   c) said subtraction circuit comprising a digital network; and
   d) said first nonlinear circuit comprising a read only memory for storing a nonlinear transfer characteristic and for providing a value at output from an address in memory said address corresponding to the output signal value of said subtraction circuit.

32. A multiplexed difference type neural network subassembly comprising:
   a) an input data connector for accepting an input data vector, said input data vector component values arriving sequentially at prescribed arrival intervals;
   b) a neuron network layer comprising at least one multiplexed difference type neurons, each said multiplexed difference neuron comprising,
      i) an input connector for accepting an input data vector, said input vector elements arranged in serial order,
      ii) an input connector for accepting a reference vector, said reference vector elements arranged to correspond to the order of said input vector elements serial order,
      iii) a vector differencing circuit for forming the difference between said corresponding input vector elements and said reference vector elements,
      iv) a distance value generating circuit connected to said differencing circuit output for forming an output value representative of the distance between said input vector and said reference vector,
      v) a subtraction circuit, connected to the output of said distance value generating circuit and to an offset magnitude input signal for forming a combined output signal value by subtracting said offset magnitude input signal from said distance value signal for controlling the radius of the neuron cell hyperspherical discriminant function surface, and
      vi) a first nonlinear circuit for mapping said combined value signal to a value representative of a prescribed discriminant function;
   c) at least one output latch, each said latch connected to the output of one said multiplexed difference type neurons for accepting and storing output values from said multiplexed difference type neurons; and
   d) a next layer input multiplexer network for providing multiplexed output signals, said next layer input multiplexer network comprising one input connection for each said multiplexed difference type neuron, selection control means for selecting one of said input connections for outputting on said multiplexer output terminal.

33. A multiplexed multilayer difference type neural network comprising serially connected multiplexed difference type neural network subassemblies each said multiplexed difference type neural network subassemblies corresponding to a distinct neural network layer, the multiplexed difference type neural network subassembly of the first neural network layer operating on an externally supplied input data vector, all other layer input vectors being the output of a next lower layer multiplexed difference type neural network subassembly, the output of the highest neural network layer being the output of the multiplexed multilayer difference type neural network, and each multiplexed difference type neural network subassembly comprising:

a) an input data connector for accepting an input data vector, said input data vector component values arriving sequentially at prescribed arrival intervals;

b) a neuron network layer comprising at least one multiplexed difference type neurons, each said multiplexed difference neuron comprising,
  i) an input connector for accepting an input data vector, said input vector elements arranged in serial order,
  ii) an input connector for accepting a reference vector, said reference vector elements arranged to correspond to the order of said input vector elements serial order,
  iii) a vector differencing circuit for forming the difference between said corresponding input vector add said reference vector elements,
  iv) a distance value generating circuit connected to said differencing circuit output for forming an output value representative of the distance between said input vector elements and said reference vector,
  v) a subtraction circuit connected to the output of said distance value generating circuit and to an offset magnitude input signal for forming a combined output signal value by subtracting said offset magnitude input signal from said distance value signal for controlling the radius of the neuron cell hyperspherical discriminant function surface, and
  vi) a first nonlinear circuit for mapping said combined value signal to a value representative of a prescribed discriminant function;

c) at least one output latch, each said latch connected to the output of one said multiplexed difference type neurons for accepting and storing output values from said multiplexed difference type neurons; and d) a next layer input multiplexer network for providing multiplexed output signals, said next layer input multiplexer network comprising one input connection for each said multiplexed difference type neuron, selection control means for selecting one of said input connections for outputting on said multiplexer output terminal.

* * * * *